United States Patent
Baldemair et al.

(10) Patent No.: US 9,510,350 B2
(45) Date of Patent: Nov. 29, 2016

(54) REFERENCE SIGNAL ALLOCATION FOR FLEXIBLE DATA LENGTHS

(71) Applicant: Telefonaktiebolaget L M Ericsson (publ), Stockholm (SE)

(72) Inventors: Robert Baldemair, Solna (SE); Ning He, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 3 days.

(21) Appl. No.: 14/402,372

(22) PCT Filed: Sep. 12, 2014

(86) PCT No.: PCT/SE2014/051055
§ 371 (c)(1),
(2) Date: Nov. 20, 2014

(87) PCT Pub. No.: WO2015/038057
PCT Pub. Date: Mar. 19, 2015

(65) Prior Publication Data
US 2015/0319757 A1    Nov. 5, 2015

Related U.S. Application Data

(60) Provisional application No. 61/877,466, filed on Sep. 13, 2013.

(51) Int. Cl.
*H04W 72/04* (2009.01)
*H04L 5/00* (2006.01)
*H04L 5/14* (2006.01)

(52) U.S. Cl.
CPC ........ *H04W 72/0446* (2013.01); *H04L 5/0048* (2013.01); *H04L 5/0064* (2013.01); *H04L 5/0007* (2013.01); *H04L 5/1469* (2013.01)

(58) Field of Classification Search
None
See application file for complete search history.

(56) References Cited

U.S. PATENT DOCUMENTS

2007/0189332 A1    8/2007  Phan et al.
2008/0267105 A1    10/2008 Wang et al.
(Continued)

FOREIGN PATENT DOCUMENTS

EP    2131619 A2     12/2009
WO    2006002658 A1   1/2006
(Continued)

OTHER PUBLICATIONS

Srinivasan R., et al., "IEEE 802.16m System Description Document (SDD)", Jul. 27, 2009, pp. 1-161, IEEE.
(Continued)

*Primary Examiner* — Faruk Hamza
*Assistant Examiner* — Cassandra Decker
(74) *Attorney, Agent, or Firm* — Coats & Bennett, PLLC

(57) ABSTRACT

Physical layer characteristics, e.g., reference signal density, reference signal distribution, data parameters, etc., are defined in the physical layer for sub-frames of a transmission time interval (TTI) allocated to data packet(s) based on the number of allocated sub-frames. The flexibility provided by the solution presented herein enables the associated wireless system to better define those physical layer characteristics necessary to meet signal quality and system requirements without unnecessarily overburdening the system overhead. Thus, the reference signal overhead may be reduced, which leads to reduced system overhead and/or increased spectrum efficiency.

20 Claims, 15 Drawing Sheets

(56) References Cited

U.S. PATENT DOCUMENTS

| | | | |
|---|---|---|---|
| 2010/0238877 A1* | 9/2010 | Nam | H04L 5/0048 370/329 |
| 2011/0103343 A1* | 5/2011 | Nishio | H04W 72/10 370/330 |
| 2012/0014476 A1 | 1/2012 | Kuchi et al. | |
| 2012/0058791 A1* | 3/2012 | Bhattad | H04L 1/0606 455/509 |
| 2012/0106374 A1* | 5/2012 | Gaal | H04L 5/0048 370/252 |
| 2013/0336270 A1 | 12/2013 | Nagata et al. | |
| 2014/0362832 A1* | 12/2014 | Rudolf | H04L 1/1822 370/336 |

FOREIGN PATENT DOCUMENTS

| | | |
|---|---|---|
| WO | 2014168525 A1 | 10/2014 |
| WO | 2015038056 A1 | 3/2015 |

OTHER PUBLICATIONS

Motorola, "System simulation results with non-static TTI", 3GPP TSG RAN1 LTE Ad Hoc, Cannes, France, Jun. 27, 2006, pp. 1-8, R1-061715, 3GPP.

Motorola, "Variable TTI for LTE", 3GPP TSG RAN WG1#44, Denver, USA, Feb. 13, 2006, pp. 1-5, R1-060394, 3GPP.

\* cited by examiner

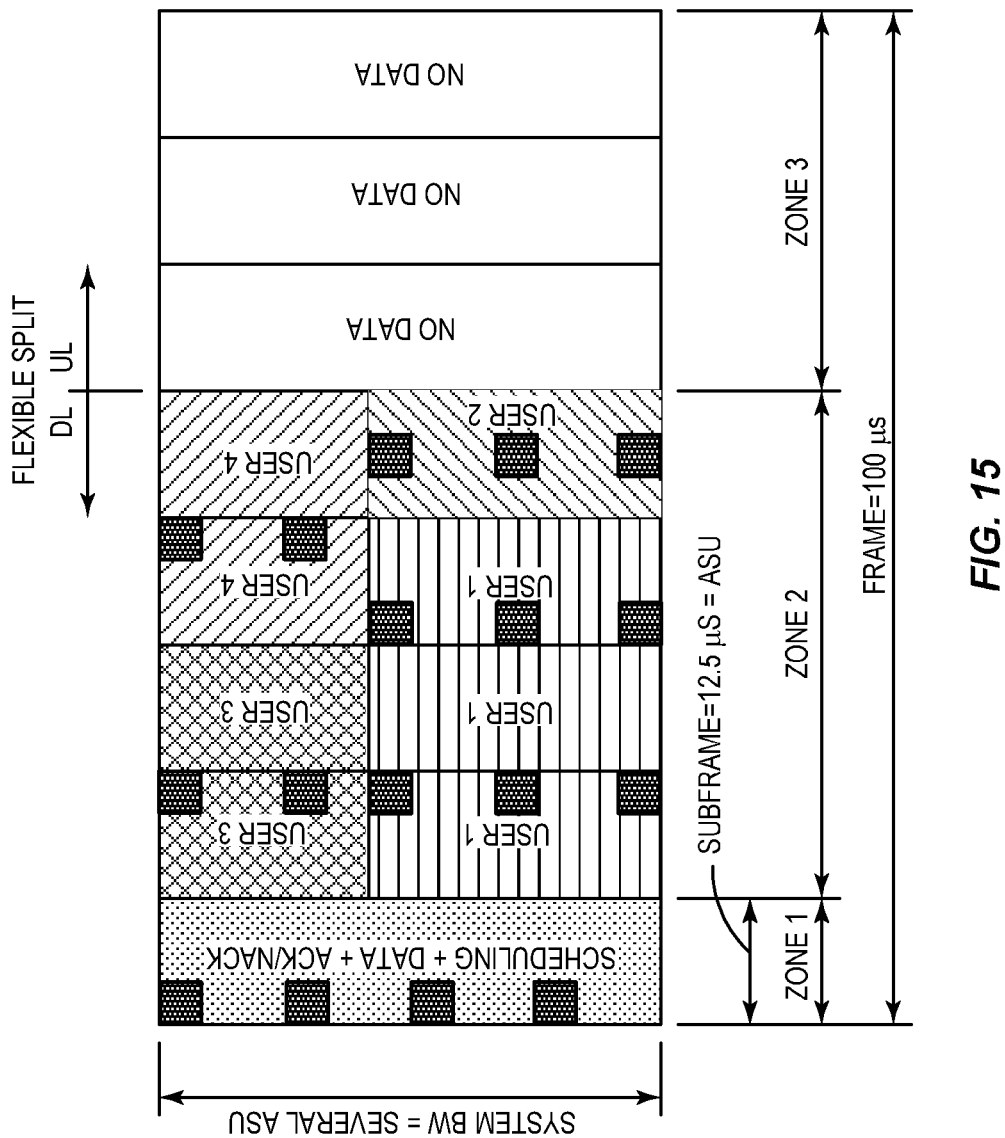

REFERENCE SIGNAL ALLOCATION FOR FLEXIBLE DATA LENGTHS

This application claims priority to Provisional U.S. Patent Application Ser. No. 61/877,466 filed 13 Sep. 2013, the disclosure of which is incorporated herein by reference in its entirety.

TECHNICAL FIELD

The invention disclosed herein relates generally to reference signal allocation in data packets transmitted in a wireless communication system, and more particularly to the flexible allocation of physical layer characteristic(s) within variable length data packets.

BACKGROUND

Over the past several decades, radio communications have significantly impacted the ways in which people go about their daily lives. Sensor systems use radio communications to exchange data and commands. People use radio communications to chat with other people (e.g., via voice calls, texting, instant messaging, video calls, etc.), stream videos, listen to music, download information, send/receive photos, etc. Such a wide variety of different types of radio communications typically have a wide range of requirements. Efficient, flexible, and low cost designs capable of meeting all of these requirements are desirable, and will be important for meeting future radio communication demands.

One way wireless devices strive to meet such requirements is through the use of pilot or reference signals, which are transmitted by a transmitter and known by a receiver. Radio signals experience various distortions when propagated from the transmitter to the receiver via radio propagation channels. The transmission of the pilot or reference signals, e.g., with the data signals, enables the receiver to more accurately recover the transmitted signal. More particularly, the receiver uses the known pilot/reference signal(s) to estimate the radio channel between the transmitter and the receiver, and uses the estimated radio channel to perform equalization on the data signal to accurately recover the transmitted data signal. Because the receiver relies heavily on pilot/reference signals to accurately process received data, and because the use of such pilot/reference signals requires a fair amount of overhead, there is much interest in optimizing the use of such signals.

SUMMARY

The solution presented herein defines how physical layer characteristics, e.g., reference signal density, reference signal distribution, data parameters, etc., defined in the physical layer for sub-frames of a transmission time interval (TTI) allocated to data packet(s) may vary based on the number of allocated sub-frames. The flexibility provided by the solution presented herein enables the associated wireless system to better define those physical layer characteristics necessary to meet signal quality and system requirements without unnecessarily overburdening the system overhead. Thus, the solution presented herein enables a reduction in the reference signal overhead, which leads to reduced system overhead and/or increased spectrum efficiency.

One exemplary embodiment provides a method of transmitting data from a wireless communication device to a remote device using one or more allocated sub-frames of a transmission time interval (TTI). The method comprises allocating one or more sub-frames to a data packet and defining one or more physical layer characteristics of the allocated sub-frames based on the number of allocated sub-frames. The one or more physical layer characteristics comprise at least one of a reference signal density, a sub-frame structure, and a data rate parameter. The reference signal density identifies a number of reference signals allocated to the data packet in response to the number of allocated sub-frames. The reference signal density varies disproportionately relative to the number of allocated sub-frames as the number of allocated sub-frames varies. The sub-frame structure identifies a distribution of one or more reference signals within the data packet in response to the number of allocated sub-frames. The data rate parameter identifies at least one of a coding rate and a rate matching of the data packet in response to the number of allocated sub-frames. The data rate parameter varies relative to the number of allocated sub-frames. The method further comprises transmitting, from the wireless communication device, the data packet according to the defined physical layer characteristics in the one or more allocated sub-frames.

Another exemplary embodiment provides a wireless communication device configured to transmit data using one or more allocated sub-frames of a transmission time interval (TTI). The wireless communication device (100) comprising an allocation circuit, a resource defining circuit, and a transmitter. The allocation circuit is configured to allocate one or more sub-frames to a data packet. The resource defining circuit is configured to define one or more physical layer characteristics of the allocated sub-frames based on the number of allocated sub-frames. The one or more physical layer characteristics comprise at least one of a reference signal density, a sub-frame structure, and a data rate parameter. The reference signal density identifies a number of reference signals allocated to the data packet in response to the number of allocated sub-frames. The reference signal density varies disproportionately relative to the number of allocated sub-frames as the number of allocated sub-frames varies. The sub-frame structure identifies a distribution of one or more reference signals within the data packet in response to the number of allocated sub-frames. The data rate parameter identifies at least one of a coding rate and a rate matching of the data packet in response to the number of allocated sub-frames. The data rate parameter varies relative to the number of allocated sub-frames. The transmitter is configured to transmit the data packet according to the defined physical layer characteristics in the one or more allocated sub-frames.

Another exemplary embodiment provides a wireless communication device configured to transmit data using one or more allocated sub-frames. The wireless communication device comprising at least one processing circuit and at least one memory operatively connected to the at least one processing circuit. Using the at least one processing circuit and the at least one memory, the wireless communication device is operative to allocate one or more sub-frames to a data packet by defining one or more physical layer characteristics of the allocated sub-frames based on the number of allocated sub-frames. The one or more physical layer characteristics comprise at least one of a reference signal density, a sub-frame structure, and a data rate parameter. The reference signal density identifies a number of reference signals allocated to the data packet in response to the number of allocated sub-frames. The reference signal density varies disproportionately relative to the number of allocated sub-frames as the number of allocated sub-frames varies. The sub-frame structure identifies a distribution of one or more reference signals within the data packet in response to the number of allocated sub-frames. The data rate parameter identifies at least one of a coding rate and a rate matching of the data packet in response to the number of allocated sub-frames. The data rate parameter varies relative to the number of allocated sub-frames. The wireless communication device is further operative to transmit the data packet according to the defined physical layer characteristics in the one or more allocated sub-frames.

BRIEF DESCRIPTION OF THE DRAWINGS

FIG. 15 shows another flexible TTI structure using a flexible reference signal distribution according to another exemplary embodiment.

DETAILED DESCRIPTION

The solution presented herein facilitates a more efficient use of time and frequency resources by variably defining the physical layer characteristics of the time and/or frequency resources allocated to a data packet. To facilitate the detailed description of the solution, the following first explains the terminology and system components that form the backdrop for this solution.

Figure 1:
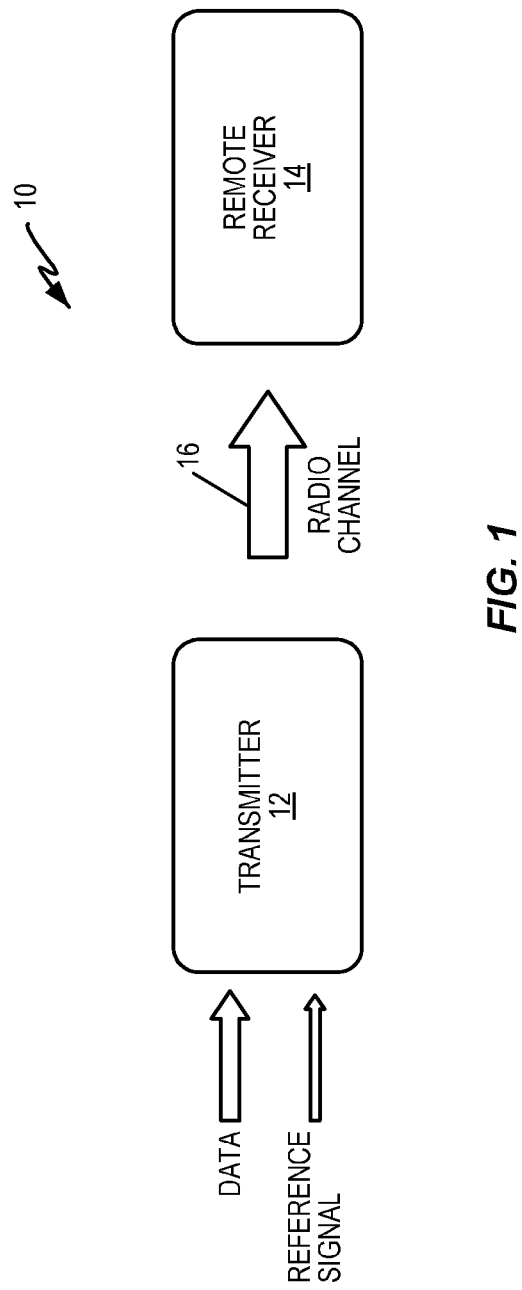
FIG. 1 shows an exemplary wireless communication system.

In wireless systems, e.g., the exemplary wireless system 10 shown in FIG. 1, a transmitter 12 transmits data with one or more reference signals to a remote device, e.g., remote receiver 14, via a wireless radio channel 16. As discussed previously, reference signals comprise those signals transmitted by the transmitter 12 and known by the receiver 14, e.g., pilot signals, that enable the remote device to estimate the radio channel 16.

The transmitter 12 discussed herein may be comprised in an access point within a wireless communication network that provides a radio communication device with access to the wireless communication network. Exemplary access points include, but are not limited to, an access node, a NodeB, an enhanced NodeB (eNodeB), and a base station. The receiver 14 discussed herein comprises a wireless receiver, which may be comprised in a radio communication device. Exemplary radio communication devices include but are not limited to, a user equipment (UE), a mobile terminal, a terminal, sensors and/or actuators with wireless capabilities, and a machine with wireless capabilities. While the solution presented herein is generally described in terms of downlink transmissions from an access point to a radio communication device, the solution presented herein applies equally well to uplink transmissions from the radio communication device to the access point. Thus, transmitter 12 and receiver 14 comprise any wireless transmitter and receiver pair that exchange wireless signals.

In conventional wireless systems, data packets are transmitted in one or more Transmit Time Intervals (TTIs) from the transmitter 12 to the receiver 14, where each TTI has a fixed duration. The minimum addressable scheduling unit is called an atomic scheduling unit (ASU). In the time domain, one ASU is equivalent to a TTI for conventional systems, where the TTI may contain one or more sub-frames. In the frequency domain, one ASU is equivalent to the smallest subunit of the system bandwidth that can be allocated to a user. During resource allocation to a user, the frequency domain may be partitioned into multiple frequency domain ASUs, where in some cases the entire system bandwidth (e.g., all of the frequency domain ASUs) in one sub-frame are allocated to one user. As a result, when the size of a data packet containing the data and reference signal(s) does not fit into a single TTI, the data packet must be partitioned into several TTIs. Reference signals are normally defined in the physical layer based on the number of ASU(s) according to a predetermined and fixed reference signal allocation plan. Thus, each conventionally allocated ASU of a TTI will have a fixed number of reference signals at fixed locations within the ASU.

Figure 6:
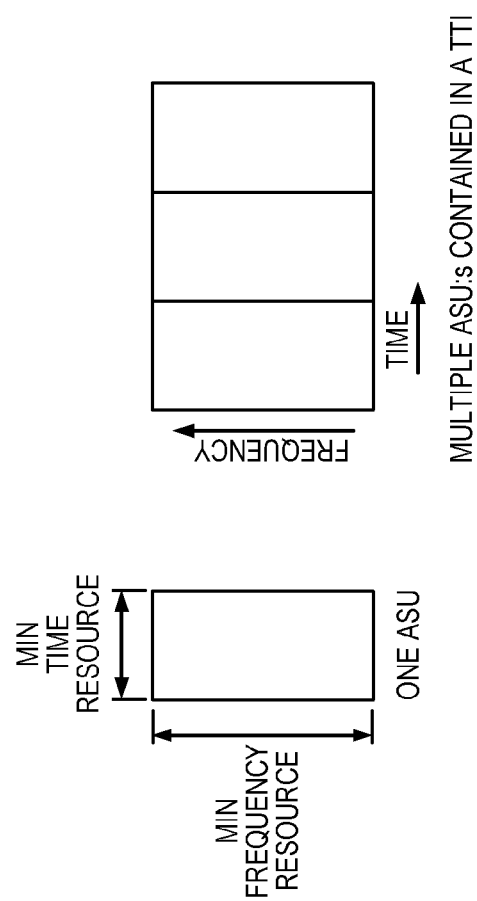
FIGS. 6A-6C show exemplary Atomic Scheduling Units (ASUs).
Figure 6:
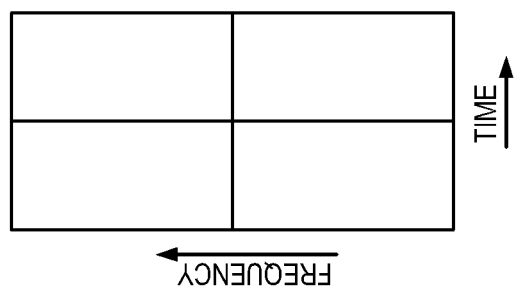

One ASU represents the minimum physical layer frequency and/or time resource unit available for allocation to a data packet. For example, in the time domain of conventional systems, one ASU is equivalent to one TTI (the minimum time resource unit in a frame available for allocation to a data packet), while in the frequency domain, one ASU is equivalent to the minimum bandwidth available for allocation to the data packet, as shown in FIG. 6A. Based on the size of the data packet to be transmitted (including the necessary control signaling and overheads introduced by reference signals, etc.), a certain number of ASUs in both the frequency and time domains are allocated in the TTI used to transmit the data packet, and thus are allocated to the data packet. For example, FIG. 6B shows a TTI spanning three ASUs. In a conventional system, all three ASUs will be allocated to a data packet whenever this TTI is allocated to that data packet. FIG. 6C shows another example, where two ASUs in the frequency domain and two ASUs in the time domain are allocated to a data packet, where the TTI spans two ASUs. In any event, conventional solutions predefine a fixed number of reference signals for each ASU, where each reference signal is distributed throughout each ASU according to the same predefined distribution plan (e.g., as shown in FIGS. 4A and 4B, which are further discussed below). The solution presented herein more flexibly defines the physical layer characteristics, which typically results in a different number of reference signals, e.g., fewer reference signals, than would be present in a conventional solution. Thus, the solution presented herein more efficiently uses the available time and frequency domain resources of each allocated ASU.

With the data rates envisioned by Ultra-Dense Networks (UDN), e.g., on the order of 10 Gbps, it becomes feasible to convey complete IP packets without partitioning the data packet into several TTIs through the use of "flexible" TTIs. Simpler protocol structures are typically the result of avoiding such partitioning. IP packets vary in size, and today the most common IP packet sizes are several tens of bytes (IP control packets) and 1500 bytes (Maximum Transmission Unit (MTU) size of Ethernet). Flexible TTIs therefore provide the ability to fit an IP packet into one TTI. For example, such flexible TTIs may be shorter in the time domain for small IP packets and longer for large IP packets. With such flexible TTI solutions, the size of a TTI is flexible, and can be fit to the size of the data packet to be transmitted, where the reference signals in the physical layer are allocated accordingly (i.e., according to the predetermined and fixed resource allocation plan designated for each ASU). U.S. Provisional Application Ser. No. 61/877,444, which is incorporated by reference herein, and which was filed concurrently with the Provisional Application of the instant application, discloses exemplary flexible TTI solutions. Such flexible TTI solutions shorten the transmission time of packet data, enable longer sleep time, and increase power efficiency of wireless communication devices (e.g., mobile terminals, user equipment, laptop computers, etc.) and access points (e.g., access nodes, base stations, etc.).

Figure 2:
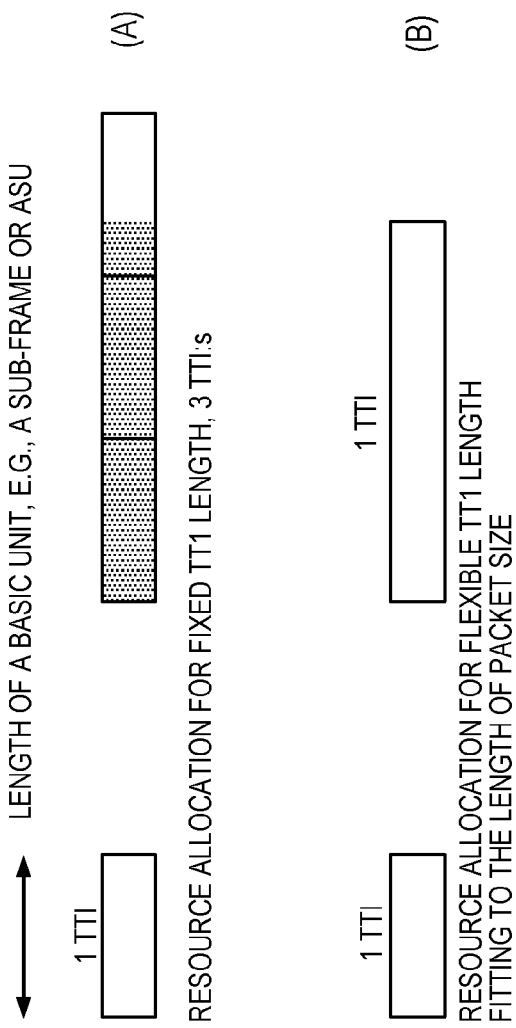
FIGS. 2A-2B show exemplary fixed and flexible TTI approaches.
Figure 3:
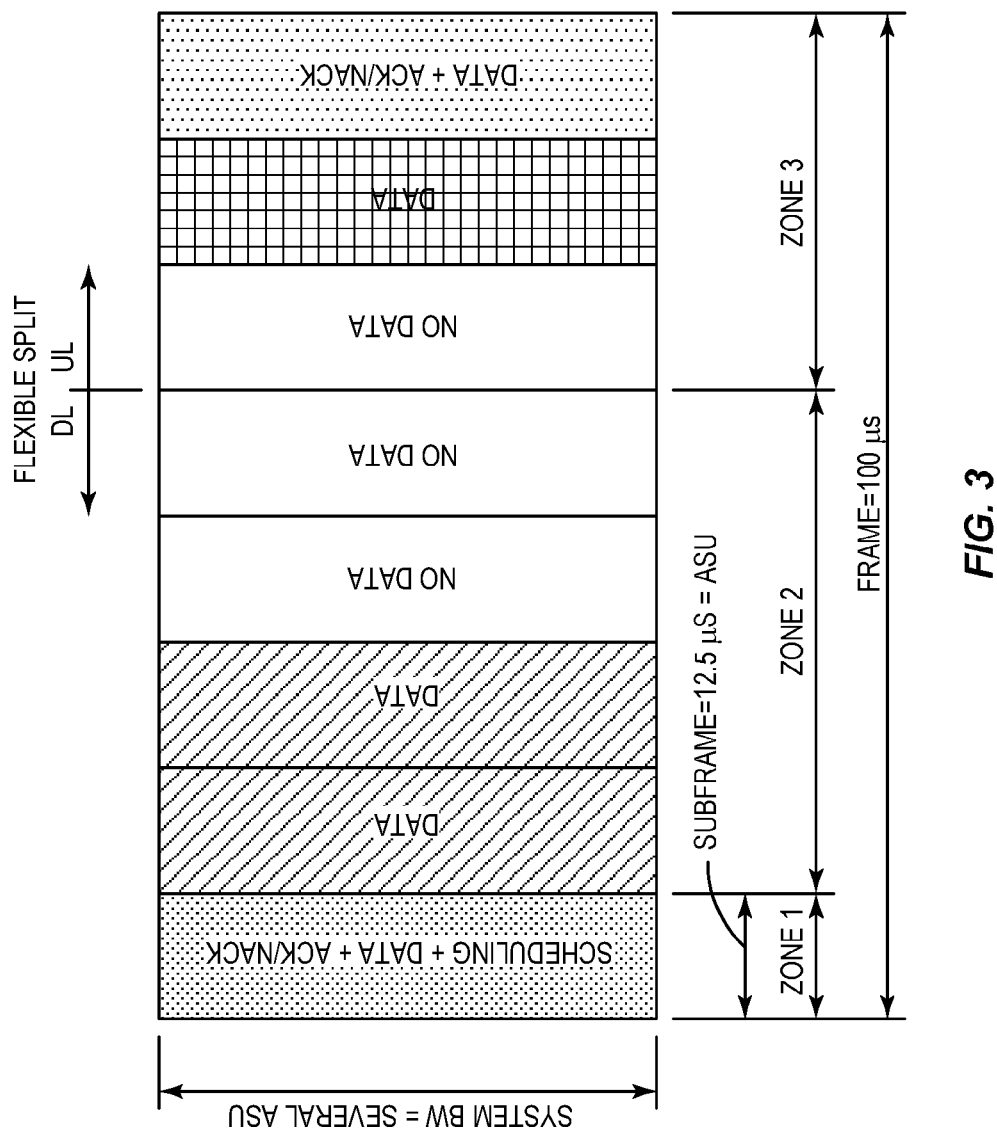
FIG. 3 shows an exemplary flexible Transmission Time Interval (TTI) frame structure.

FIGS. 2A-2B show examples of the fixed (FIG. 2A) and flexible (FIG. 2B) TTI approaches in a simplified way in only the time domain, i.e., a Time Division Multiplexing (TDM) approach. The flexible TTI solution (FIG. 2B) allows a shorter transmission time than that of the fixed TTI solution (FIG. 2B) because the flexible TTI only includes those sub-frames necessary to transmit the data packet (FIG. 2A uses a pattern of dots to show the data packet length). FIG. 3 shows an exemplary flexible TTI structure. FIG. 3 only shows flexibility in the time-domain and does not show resource granularity in the frequency-domain. Note, however, that the flexible TTI supports a Frequency Division Multiplex (FDM) component, where within a given sub-frame, a user may also be assigned a fraction of the complete bandwidth. A frame in the example of FIG. 3 is 100 μs long and is subdivided into 8 subframes, each 12.5 μs long. In the frequency-domain, the system bandwidth may, e.g., be divided into 100 MHz sub-channels.

As shown in FIG. 3, each frame starts with Zone 1, which is used for the transmission of control information (shown in Zone 1 by the medium density dotted pattern). Zones 2 and 3 respectively follow Zone 1, and represent the receive and transmit parts of the frame, respectively, from the point of view of the remote receiver 14 in a remote wireless communication device. In FIG. 3, as well as FIGS. 5 and 9-15, dark blocks with a dense dotted pattern are used to represent reference signals in Zones 1 and 2, while lined patterns are used to represent the data in the corresponding Zone 2 sub-frame(s).

The control signaling in Zone 1 contains information regarding which resources within Zone 2 the remote wireless communication device should decode and which resources the remote wireless communication device may use for transmission. The control signaling in Zone 1 may further contain acknowledgement bits from a node, e.g., a wireless communication device containing the transmitter 12, that received transmissions from the remote wireless communication device in an earlier frame.

Zone 2 contains data transmitted to the remote receiver 14 of the remote wireless communication device. Depending on the amount of data in a data packet, one, a few, or all sub-frames within Zone 2 may be assigned to the remote wireless communication device. If the assigned resources for one frame are too few to convey a complete data packet, flexible TTI may even extend into the next frame, and sub-frames from the next frame may be used. The time duration of the allocated sub-frames define the Flexible TTI length. The minimum scheduling unit in the example of FIG. 3 is 1 subframe (time)×1 sub-channel (frequency)=12.5 μs×100 MHz. As noted above, such a minimum scheduling unit (in both time and frequency) is also referred to herein as an Atomic Scheduling Unit (ASU). With a rather low spectrum efficiency of 1 bit/s/Hz one ASU can support 1250 bit≈150 byte.

If a remote wireless communication device has resources assigned in Zone 3, the radio communication device containing the receiver 14 can use these assigned resources to transmit data, e.g., to the wireless communication device containing the transmitter 12. As with the Zone 2 resources, the Zone 3 resources are presented in multiples of one sub-frame. In addition to user data transmissions, acknowledgment bits in response to received data (either in this frame, or if node processing is too slow, in response to data received in an earlier frame) may be transmitted in Zone 3. As shown in FIG. 3, the Zone 2/Zone 3 split is flexible.

Figure 4:
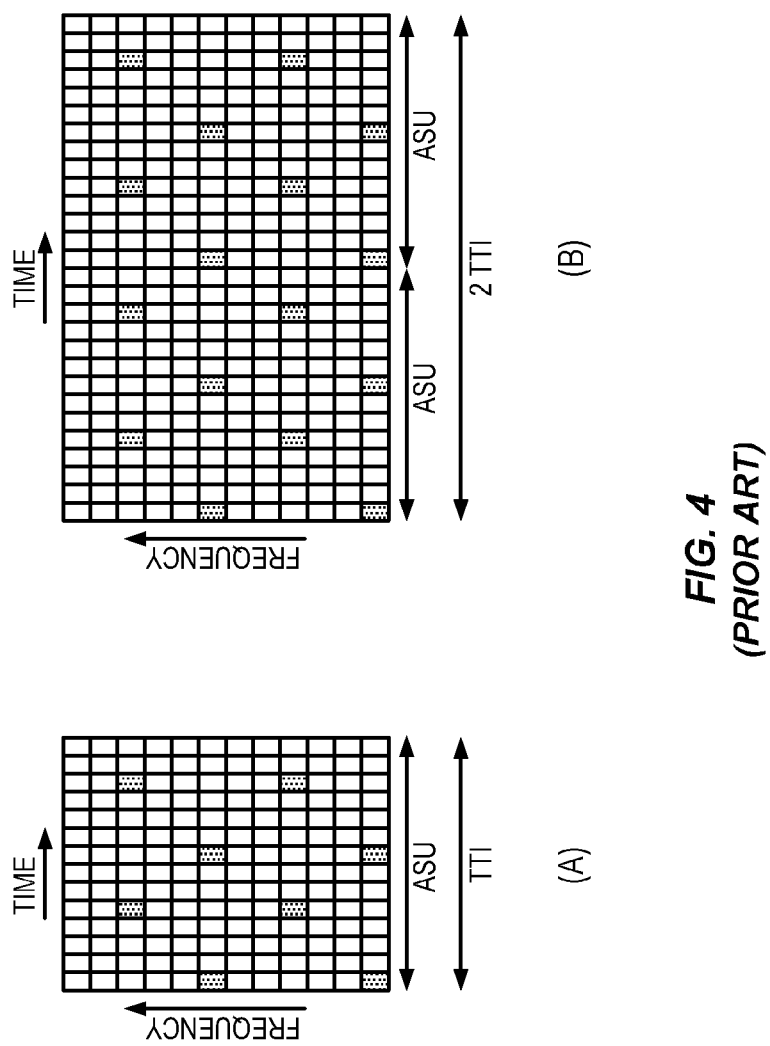
FIGS. 4A-4B show a conventional reference signal distribution for a system with frequency and time multiplexing, e.g., an Orthogonal Frequency Division Multiple Access (OFDMA) system in Long Term Evolution (LTE) networks.
Figure 5:
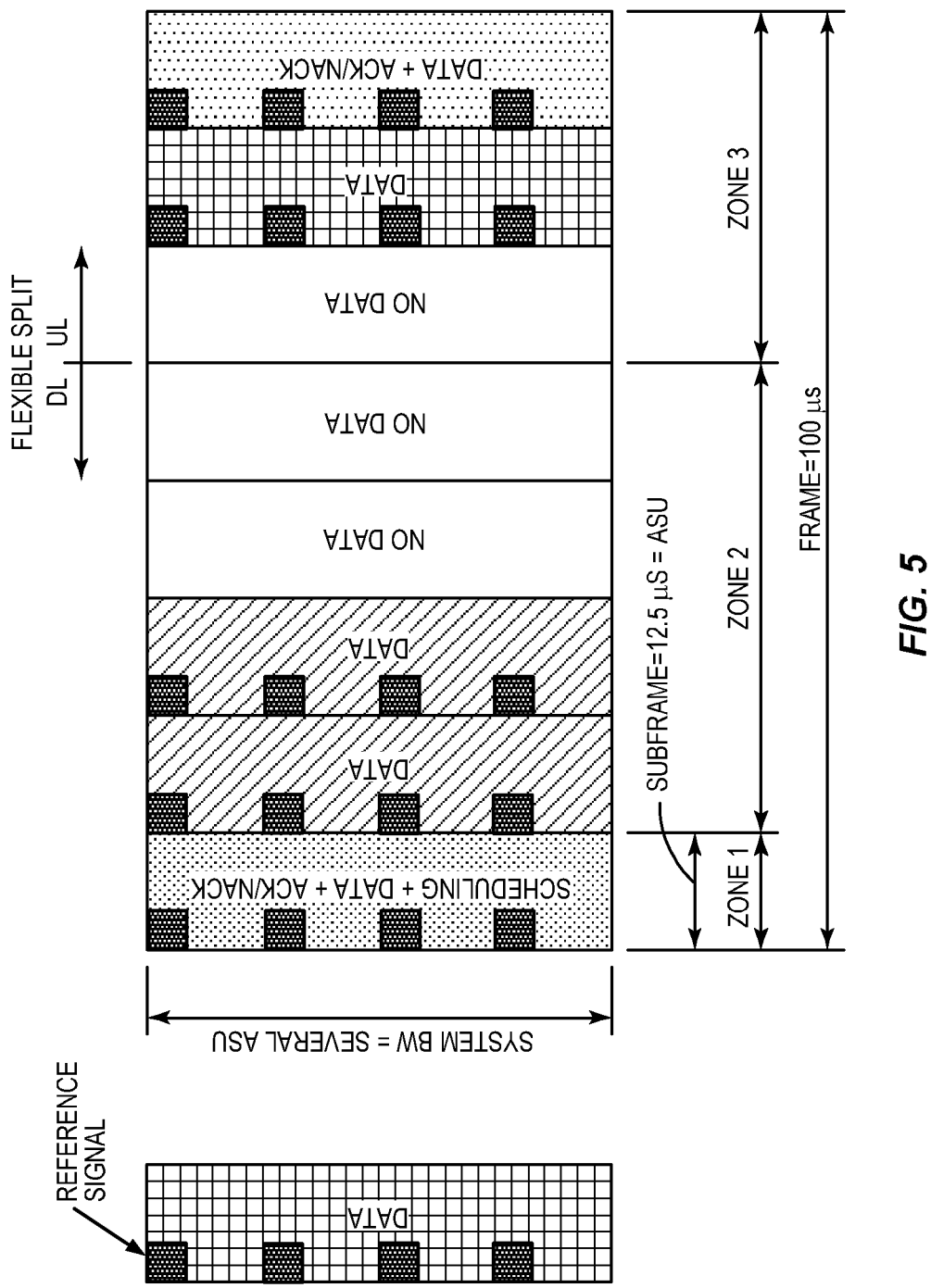
FIG. 5 shows a flexible TTI structure using a conventional reference signal distribution.

As noted above, reference signals are conventionally defined according to a predefined and fixed allocation plan. This is because in conventional wireless communication systems, e.g., in the LTE system, there is little flexibility in terms of the time and frequency resource allocation for reference signals. Channel estimates for data at time-frequency positions without reference signals are then obtained by interpolation and extrapolation (in time and/or frequency) from the channel estimates determined for the time-frequency positions containing the reference signals. In general, the conventional number of reference signals embedded into a TTI does not depend on the length of the TTI. Rather, time and frequency resource elements are reserved in advance for reference signals, where in conventional solutions these reserved reference signal resources within an ASU are fixed in both location and density. For example, FIG. 4 shows a conventional reference signal distribution for a system with frequency and time multiplexing, e.g., an Orthogonal Frequency Division Multiple Access (OFDMA) system in Long Term Evolution (LTE) networks. In FIG. 4, the dark blocks with a dense dotted pattern show areas within a sub-frame reserved for reference signals, where FIG. 4A shows one time-domain ASU in one TTI, and FIG. 4B shows two time-domain ASUs for two TTIs. FIG. 5 shows another conventional reference signal distribution for a system utilizing a flexible TTI solution. In FIG. 5, the smaller blocks having a dense dotted pattern represent time and frequency domain resources within the sub-frames reserved for reference signals. The lined patterns and the less dense dotted pattern in Zones 2 and 3 represent the data in the corresponding sub-frame, where different patterns are given to different types of data, e.g., downlink (DL), uplink (UL), and/or ACK/NACK. In Zone 1, the medium density dotted pattern represents the control signaling discussed above. As shown by both FIGS. 4 and 5, the number of reference signals defined by conventional solutions, which always uses the same time and frequency resources in each ASU, increases proportionally with the number of allocated ASUs. While this distribution provides a sufficient number of reference signals to allow accurate recovery of the transmitted data, such a proportional allocation of the reference signals may consume an unnecessary number of time and frequency resources.

The solution presented herein statically or semi-statically defines resources, including one or more physical layer characteristics of the sub-frame(s) allocated to a data packet, based on the number of sub-frames allocated to the data packet. The allocated sub-frames are preferably, but not necessarily, scheduled contiguously.

Figure 7:
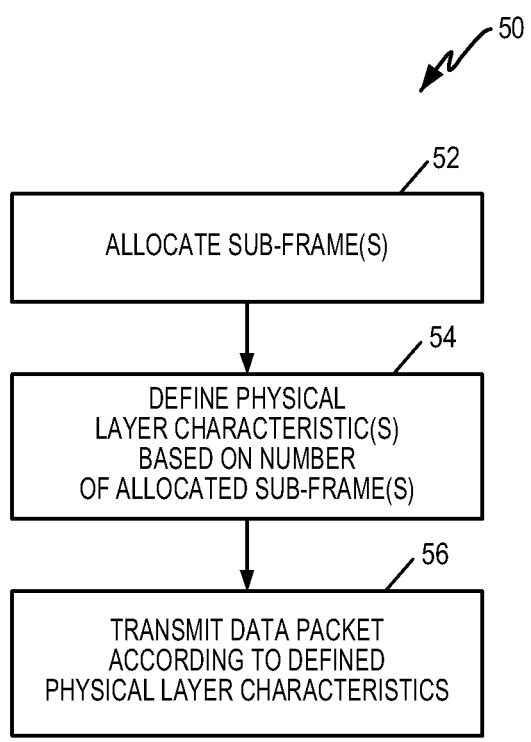
FIG. 7 shows an exemplary method of reference signal distribution within a transmitted data packet according to an exemplary embodiment.
Figure 8:
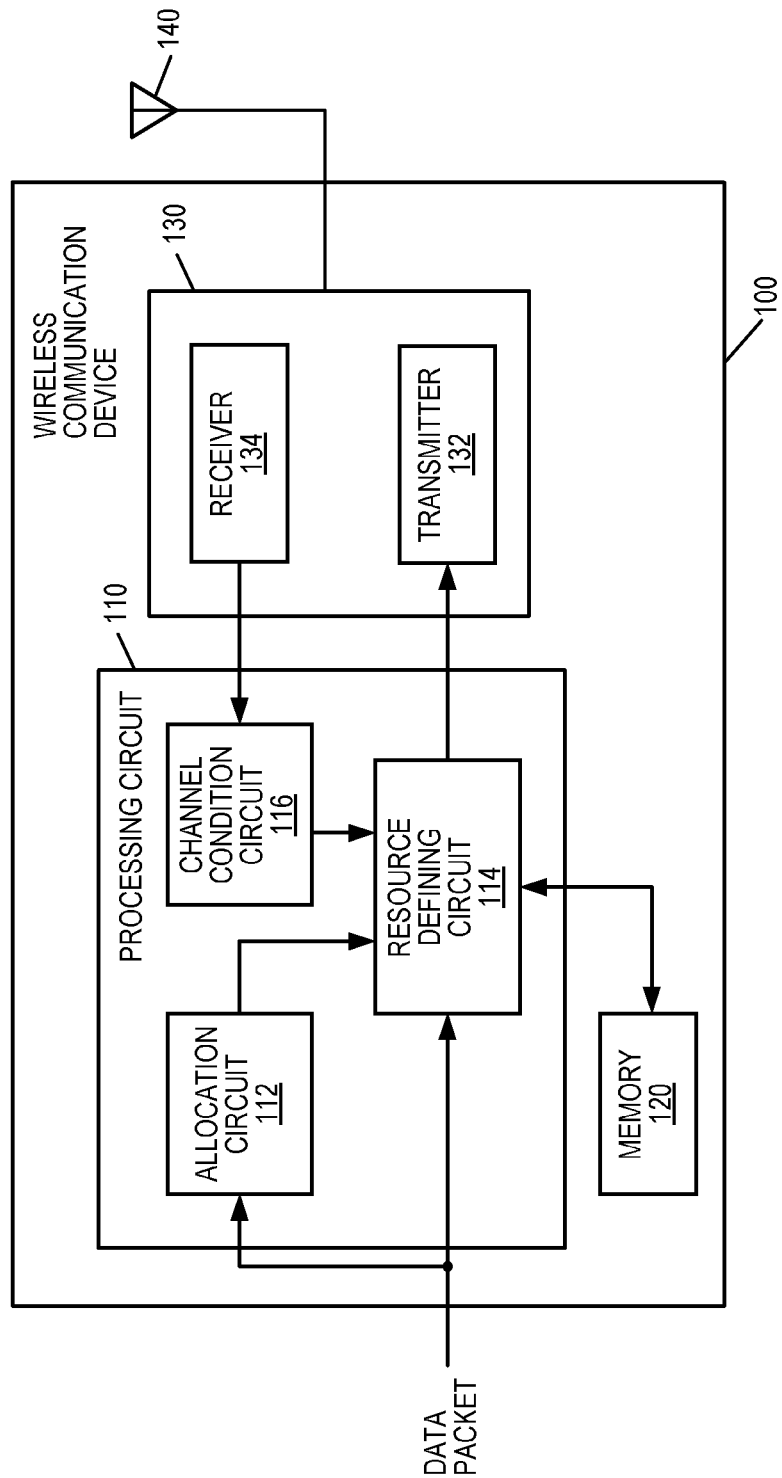
FIG. 8 shows a wireless communication device according to one exemplary embodiment.

FIG. 7 shows one exemplary method 50 of transmitting a data packet allocated one or more sub-frames, as executed by a wireless communication device 100 (FIG. 8). The physical layer characteristics of each sub-frame are defined based on the number of allocated sub-frames. Accordingly, the wireless communication device 100 allocates one or more sub-frames to a data packet for transmission to a remote device 14 (block 52). Based on the number of allocated sub-frames, the wireless communication device 100 defines one or more physical layer characteristics of the allocated sub-frames (block 54). The wireless communication device 100 then transmits the data packet according to the defined physical layer characteristics in the allocated sub-frame(s) (block 56). In so doing, the solution presented herein provides a sufficient amount of resources needed to meet signal quality requirements without overburdening the system.

FIG. 8 shows an exemplary wireless communication device 100. Wireless communication device 100 comprises one or more processing circuits 110, one or more memories 120, a transceiver 130, and at least one antenna 140. These components operate together to execute the method 50 of FIG. 7.

In one exemplary embodiment, processing circuit 110 comprises an allocation circuit 112 and a resource defining circuit 114. The processing circuit 110 may also optionally include a channel condition circuit 116, discussed further below. The allocation circuit 112 is configured to allocate one or more sub-frames to a data packet. This allocation may be made according to a flexible TTI solution. The resource defining circuit 114 is configured to define one or more physical layer characteristics of the allocated sub-frame(s) based on the number of allocated sub-frame(s), where the physical layer characteristic(s) comprise at least one of a reference signal density, a sub-frame structure, and a data rate parameter. The transceiver 130 comprises a transmitter 132 configured to transmit wireless signals to a remote device 14 via antenna 140, and a receiver 134 configured to receive wireless signals via antenna 140. In particular, the transmitter is configured to transmit the data packet according to the defined physical layer characteristics in one or more allocated sub-frames.

The resource defining circuit 114 may define the physical layer characteristics based on one or more tables stored in memory 120 that cross-reference different physical layer characteristic options with different numbers of sub-frames. Alternatively, resource defining circuit 114 may define the physical layer characteristics according to an algorithm dependent on the number of sub-frames. In yet another embodiment, the resource defining circuit 114 may receive physical layer characteristic options from a remote network node (not shown) based on the number of allocated sub-frames provided to the remote network node, and subsequently select one option to define the physical layer characteristics.

The physical layer characteristics defined by the resource defining circuit 114 may include a reference signal density, a reference signal distribution, and/or a data rate parameter. The reference signal density identifies a number of reference signals allocated to the data packet. A sub-frame structure identifies the reference signal distribution within the data packet. The data rate parameter identifies at least one of a coding rate and a rate matching of the data in the data packet.

As discussed above, the resource defining circuit 114 defines the physical layer characteristic(s) based on a number of allocated sub-frames. The physical layer characteristics may be defined by increasing or decreasing the number of reference signals, changing the reference signal distribution, changing the data rate parameter, etc., all based on the number of allocated sub-frames. In one exemplary embodiment, the resource defining circuit 114 defines the physical layer characteristics by disproportionately increasing the number of reference signals allocated to the data packet as the number of allocated sub-frames increases. In another exemplary embodiment, the resource defining circuit 114 defines the physical layer characteristics by varying a distribution of the plurality of reference signals in one or more of the allocated sub-frames based on the number of allocated sub-frames as the number of allocated sub-frames varies. In still another exemplary embodiment, the resource defining circuit 114 defines the physical layer characteristics by defining the reference signal density and the sub-frame structure (i.e., the reference signal distribution) based on the number of allocated sub-frames. It will be appreciated that the resource defining circuit 114 may define more than one physical layer characteristics. For example, the resource defining circuit 114 may define the reference signal density and the reference signal distribution based on the number of allocated sub-frames.

In one exemplary embodiment, the wireless communication device 100, e.g., the resource defining circuit 114 in device 100, defines a first physical layer characteristic for all data packets allocated a minimum number of sub-frames, e.g., one or two sub-frames. For data packets allocated more than the minimum number of sub-frames, the resource defining circuit 114 defines a second physical layer characteristic. In some cases, defining the first and second physical layer characteristics comprises defining first and second configurations of the same physical layer characteristic. For example, the resource defining circuit 114 may define a first number of reference signals for all data packets allocated a minimum number of sub-frames, and may define a second number of reference signals for data packet(s) allocated a second number of sub-frames exceeding the minimum number of allocated sub-frames. In this case, e.g., the first number of reference signals are optimized in frequency and time based on, e.g., a coherence time of a channel and a size of the data block to be transmitted over the channel, where the second number of reference signals may be equal to or greater than the first number of reference signals. In other cases, defining the first and second physical layer characteristics comprises defining different physical layer characteristics. For example, the resource defining circuit 114 may define a number of reference signals for all data packets allocated a minimum number of sub-frames, and may define a reference signal distribution for data packet(s) allocated a second number of sub-frames exceeding the minimum number of allocated sub-frames. While these examples only discuss first and second physical layer characteristics for two different quantities of allocated sub-frames, it will be appreciated that these examples may be expanded to include more than two different quantities of allocated sub-frames. For example, the resource defining circuit 114 may define a third number of reference signals for data packet(s) allocated more than the second number of sub-frames.

The resource defining circuit 114 may also adjust the defined physical layer characteristics based on other variables, e.g., a channel condition. For example, the wireless communication device 100 may further include a channel condition circuit 116 configured to determine at least one channel condition associated with the data packet. The resource defining circuit 114 may then adjust the defined physical layer characteristics based on the determined channel condition(s). Exemplary channel conditions include, but are not limited to a speed of the wireless communication device 100, a speed of the remote receiver 14 intended to receive the data packet, a carrier frequency (e.g., 3 GHz, 20 GHz), a location of the wireless communication device 100 relative to a structure, a location of the remote receiver 14 intended to receive the data packet relative to a structure, a frequency selectivity of a wireless channel between the wireless communication device 100 and the remote device 14, and a Doppler shift of the radio channel. For example, the resource defining circuit 114 may adjust the defined physical layer characteristics with respect to maximum Doppler spread due to mobility, e.g., may increase the number of reference signals as the speed increases. In another example, the resource defining circuit 114 may adjust the defined physical layer characteristic(s) based on an available transmission power of the wireless communication device 100, a capability of the remote receiver 14 (e.g., whether receiver 14 has a sophisticated or simple receiver algorithm), and/or a local system load/current interference. For example, the resource defining circuit 114 may adjust the defined physical layer characteristics by adding more reference signals in power limited situations. The adjustment and/or definition of the physical layer characteristics provided by the resource defining circuit 114 may be applied statically or semi-statically with deployment (e.g., indoor, outdoor, urban, highway, carrier frequency, etc.).

For simplicity, most of the following examples illustrate the solution presented herein in terms of reference signal density and/or reference signal distribution. For example, one exemplary method includes defining a reference signal density identifying a number of reference signals allocated to the data packet based on the number of allocated sub-frames, where the reference signal density varies disproportionately relative to the number of allocated sub-frames as the number of allocated sub-frames varies. It will be appreciated, however, that the solution presented herein applies equally well to other physical layer characteristics. While much of the solution presented herein is described in terms of reference signals, the reference signals mentioned herein may also be referred to as pilot signals, reference/pilot symbols, or any other signal or symbol known to the receiver and transmitted by a transmitter to help the receiver accurately estimate the radio channel and/or recover the transmitted data.

FIGS. 9-14 show several examples of variations to the reference signal density and/or distribution responsive to variations in the number of allocated sub-frames. Each of these examples shows a flexible TTI (having a variable length) used to transmit a data packet. The flexible TTI includes the previously discussed zones (e.g., Zones 1-3). As used herein, the sub-frames allocated to a data packet for transmission by transmitter 12 and reception by remote receiver 14 refer to the sub-frames in Zone 2 (i.e., the downlink sub-frames). As discussed previously, the smaller blocks having a dense dotted pattern represent time and frequency domain resources within the sub-frames in Zones 1 and 2 that are reserved for reference signals. The lined patterns in Zone 2 represent the data in the corresponding sub-frame, where different lined patterns are given to different users. In Zone 1, the medium density dotted pattern represents the control signaling discussed above.

Figure 9:
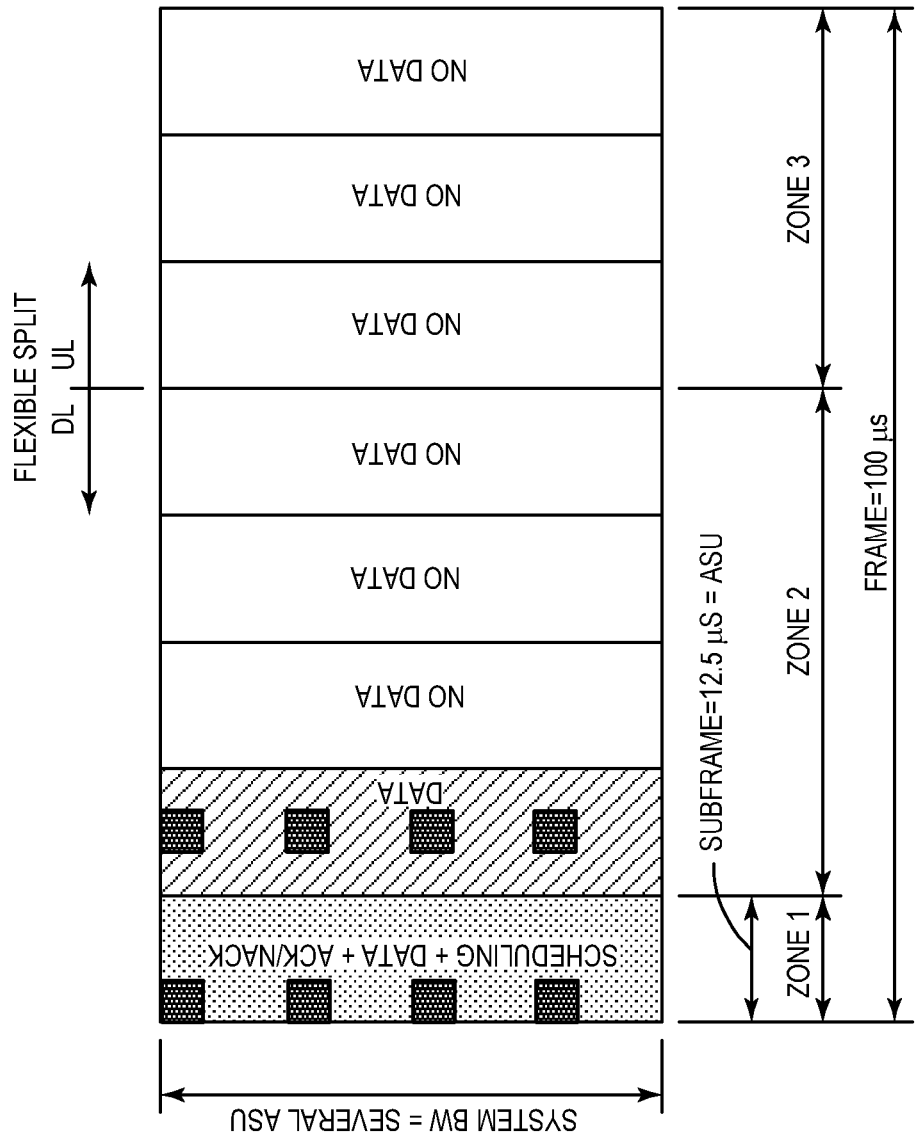
FIG. 9 shows a flexible TTI structure using a flexible reference signal distribution according to one exemplary embodiment.
Figure 10:
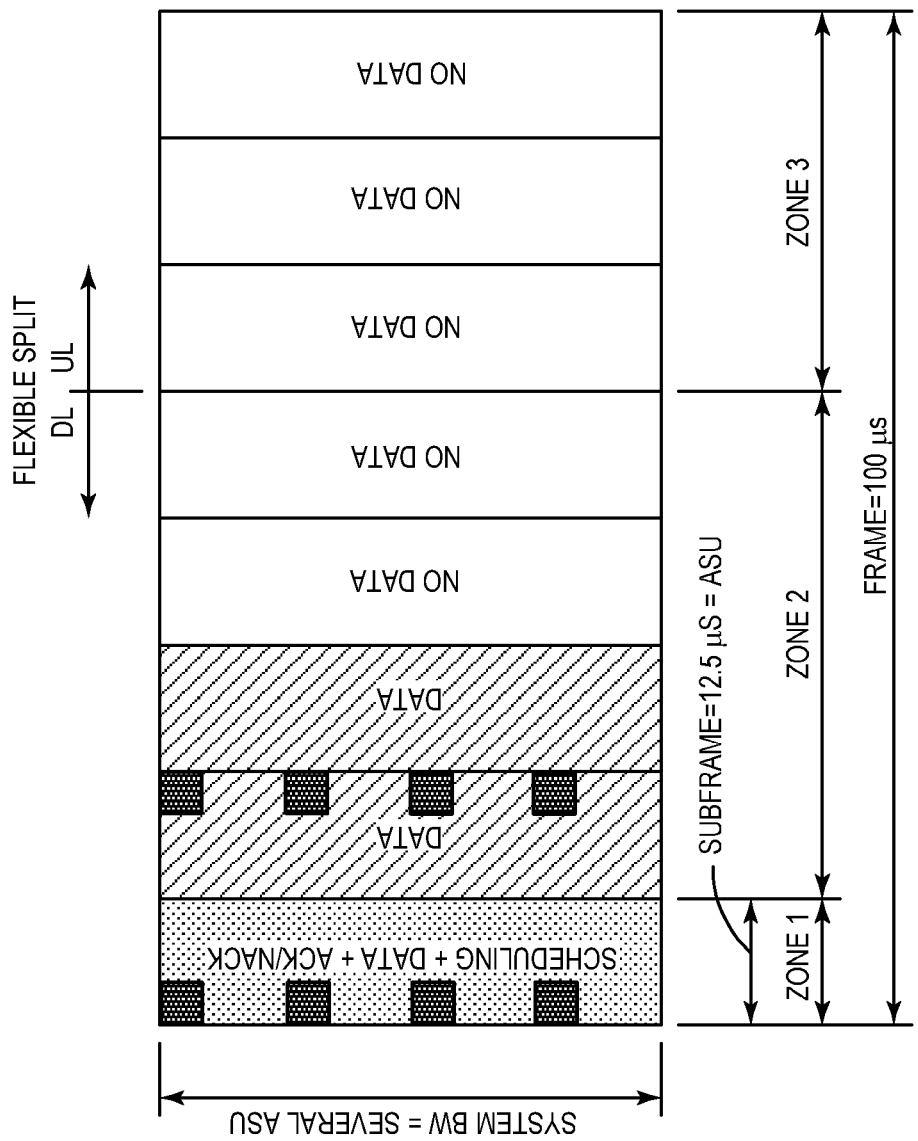
FIG. 10 shows another flexible TTI structure using a flexible reference signal distribution according to another exemplary embodiment.

FIG. 9 shows an example where the data packet is allocated only one sub-frame in Zone 2. When only one sub-frame is allocated to a data packet (as in FIG. 9), the allocated sub-frame contains some minimum number of reference signals. However, when two sub-frames are allocated to a data packet, it may be sufficient to have only reference signals (e.g., the minimum number of reference signals) in one of the allocated sub-frames, as shown in FIG. 10. In this example, channel estimates obtained based on the reference signals in the first sub-frame are reused or extrapolated for the second sub-frame. Thus, the second sub-frame does not need to include any reference signals. The accuracy of the reuse/extrapolation of the channel estimates from the first sub-frame for the second sub-frame may be improved if the reference signals in the first sub-frame are distributed towards a middle of the allocated sub-frames, e.g., towards the end of the first sub-frame. Thus, the example of FIG. 10 varies the reference signal density and distribution based on the number of allocated sub-frames. Because only one of the two allocated sub-frames contains reference signals, the example of FIG. 10 reduces the reference signal overhead, and thus reduces the system overhead.

Figure 11:
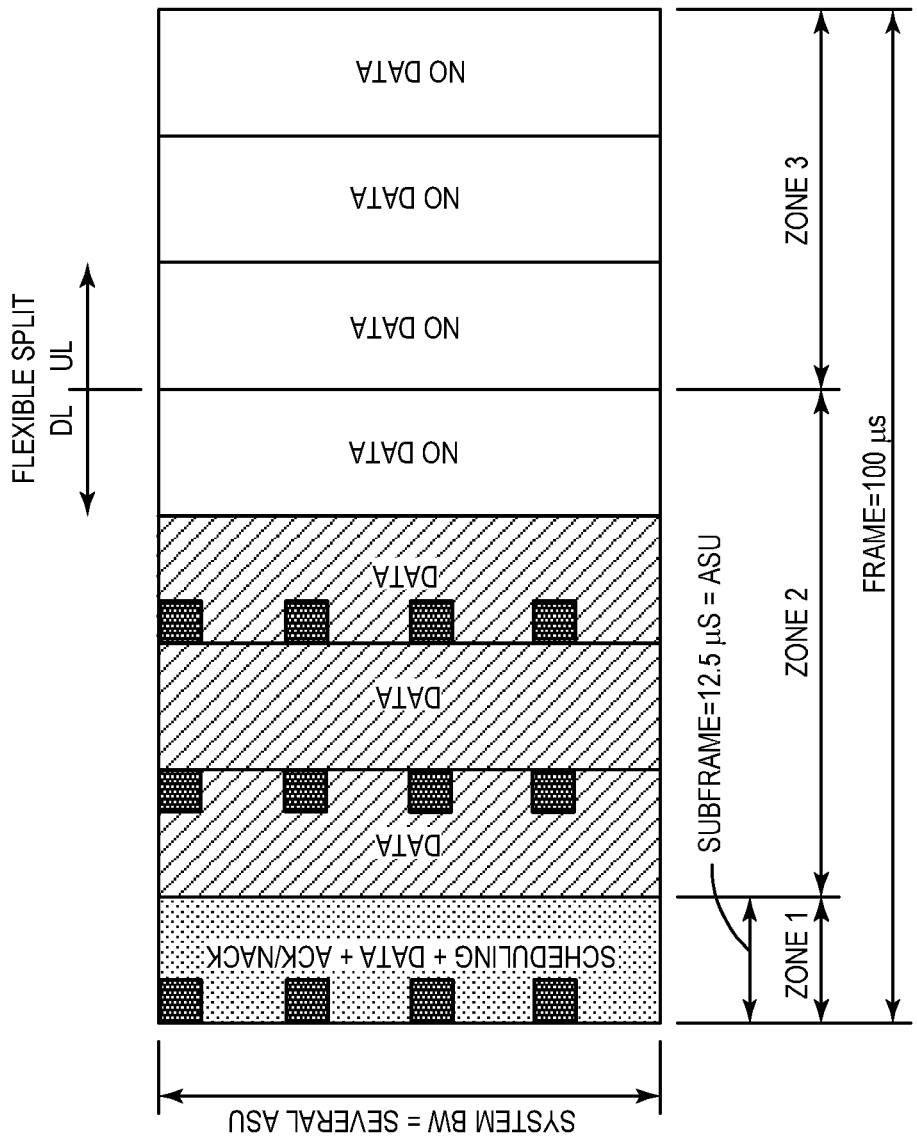
FIG. 11 shows another flexible TTI structure using a flexible reference signal distribution according to another exemplary embodiment.

FIG. 11 shows another example, where only two of the three sub-frames allocated to the data packet contain reference signals. In this example, channel estimates obtained based on the reference signals in the first and/or third sub-frames are reused or interpolated for the second sub-frame. Thus, the second sub-frame does not need to include any reference signals. The accuracy of the reuse/interpolation of the channel estimates from the first and/or third sub-frames for the second sub-frame may be improved if the reference signals in the first and/or third sub-frames are distributed along the edges of their respective sub-frames so as to be closest to the middle sub-frame. Like the example of FIG. 10, the example of FIG. 11 reduces reference signal overhead, and thus reduces system overhead relative to conventional solutions.

Figure 12:
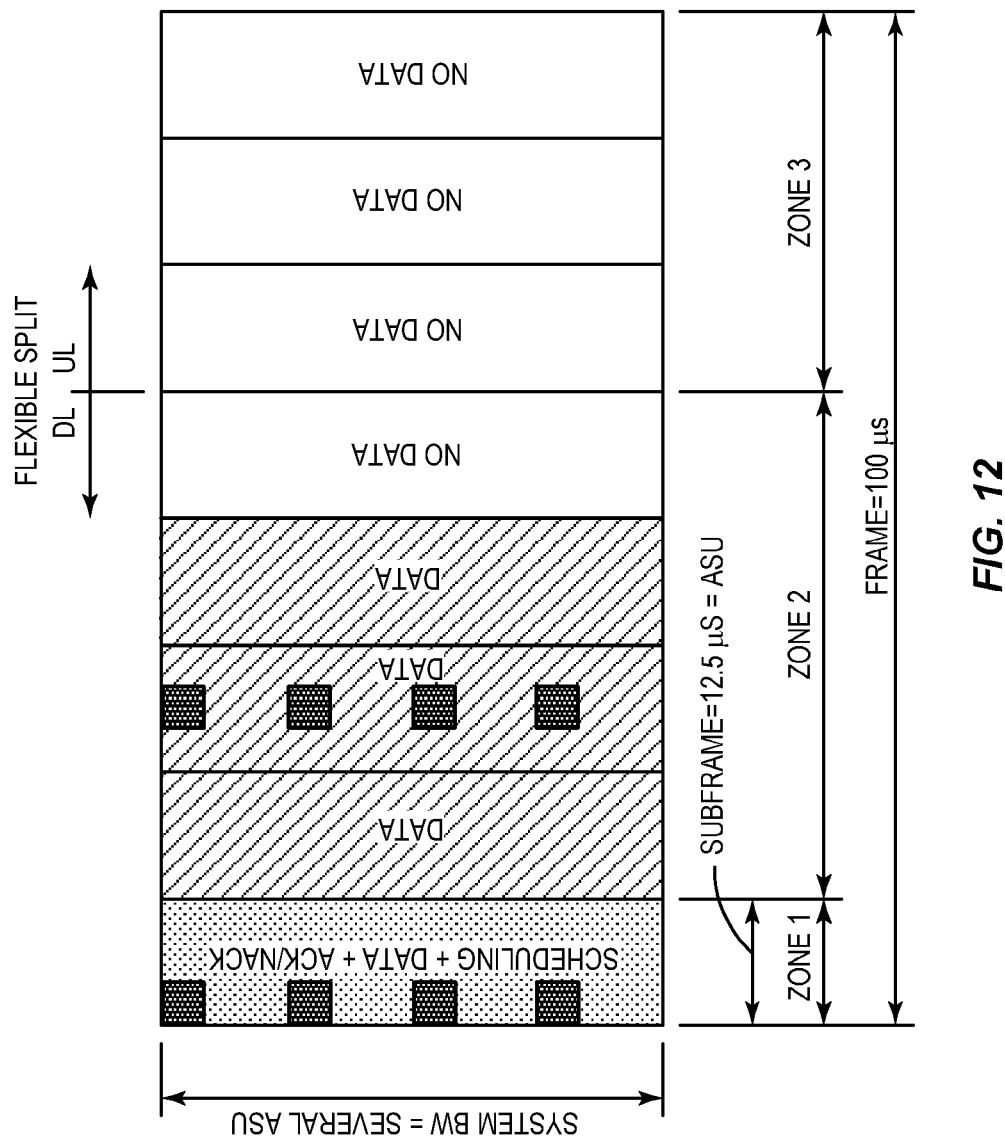
FIG. 12 shows another flexible TTI structure using a flexible reference signal distribution according to another exemplary embodiment.

FIG. 12 shows yet another example, where only one of the three time-domain sub-frames allocated to the data packet contains reference signals. In this example, channel estimates obtained based on the reference signals in the second sub-frame are reused or extrapolated for the first and third sub-frames. Thus, the first and third sub-frames do not need to include any reference signals. The accuracy of the reuse/extrapolation of the channel estimates from the second sub-frame for the first and third sub-frames may be improved if the reference signals in the second sub-frame are distributed towards a middle of the middle sub-frames, and thus along a middle of the data packet. This example shows how the reference signal overhead can be even further reduced relative to the example of FIG. 11. The solution of FIG. 12 may be best, e.g., when the relative speed between the transmitter 12 and receiver 14 is low, causing the channel to vary slowly.

Figure 13:
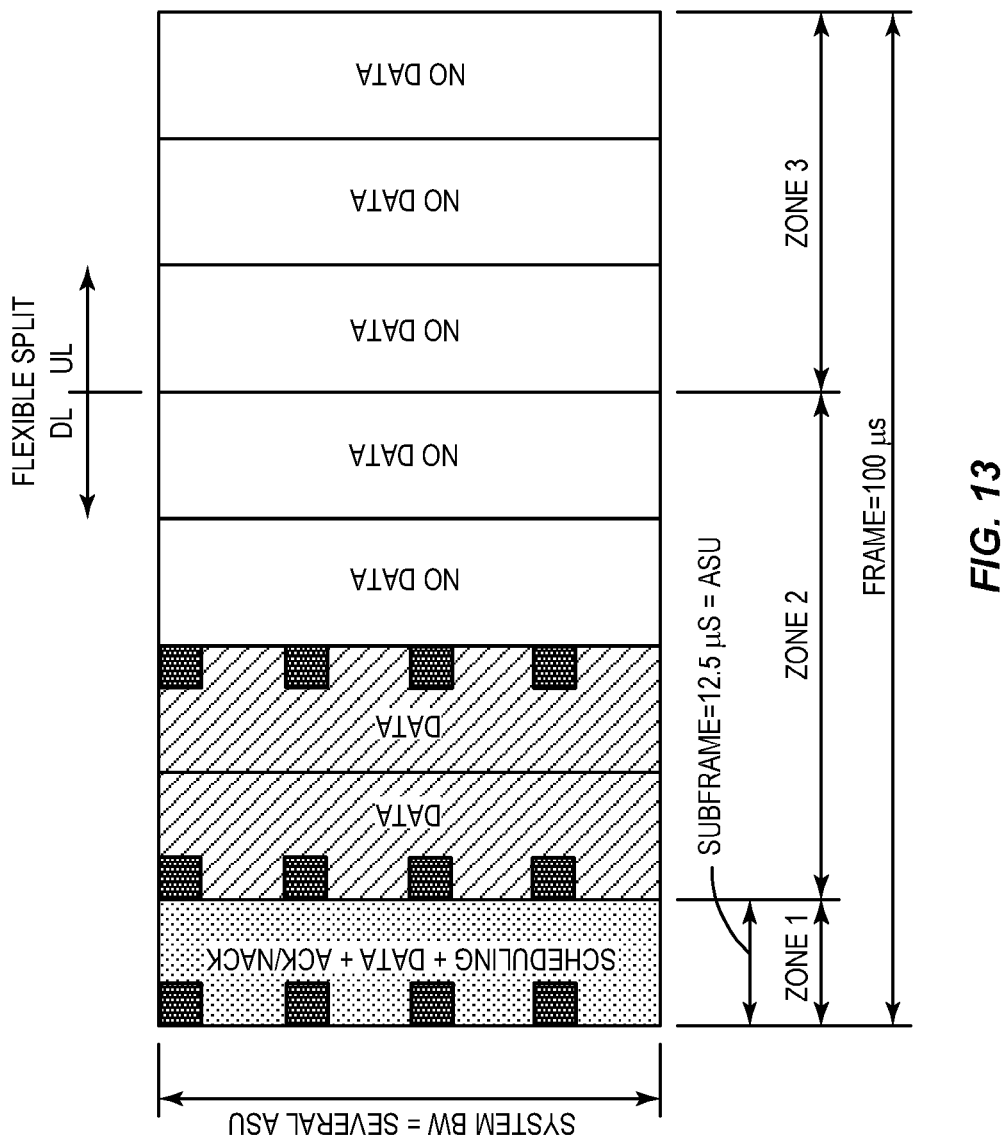
FIG. 13 shows another flexible TTI structure using a flexible reference signal distribution according to another exemplary embodiment.

FIG. 13 shows another example where both of the allocated sub-frames contain reference signals, but each allocated sub-frame has a different distribution of the reference signals. This example does not reduce the number of reference signals defined for the data packet, and thus does not reduce the reference signal overhead. However, by distributing the reference signals as shown, e.g., at opposing edges of the allocated sub-frames, this example avoids extrapolation towards the outer edges of the allocated sub-frames, and thus provides a more accurate solution. The solution of FIG. 13 may be better, e.g., when channel conditions are bad, in which cases extrapolation does not work.

Figure 14:
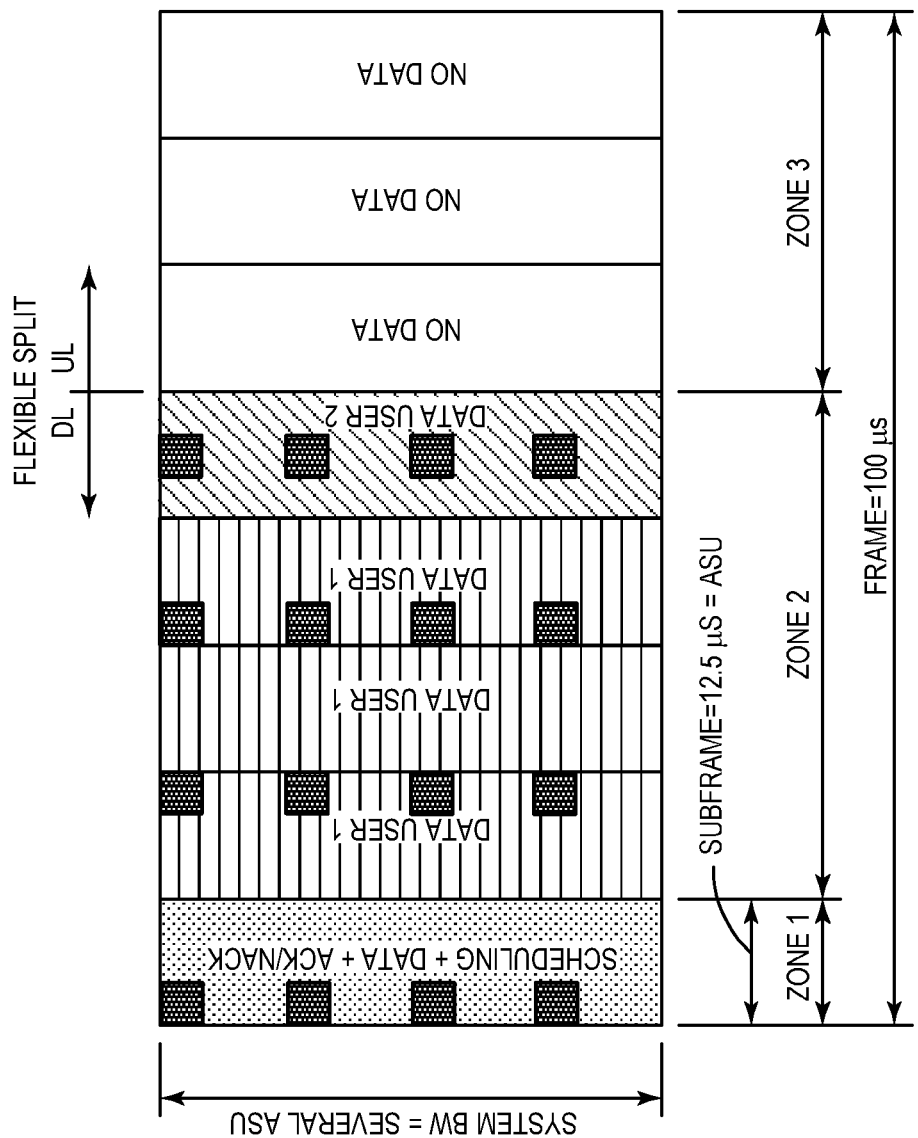
FIG. 14 shows another flexible TTI structure using a flexible reference signal distribution according to another exemplary embodiment.

FIG. 14 shows an example where one TTI includes data packets for two different users. In this case, the data packet for User 1 is allocated three sub-frames and the data packet for User 2 is allocated one sub-frame. According to the solution presented herein, different physical layer characteristics may be defined for the User 1 data packets than are defined for the User 2 data packets. In this example, the resource defining circuit 114 defines the reference signal density and distribution for User 1 the same as shown in FIG. 11, and defines the reference signal density and distribution for User 2 the same as shown in FIG. 9. It will be appreciated that the multi-user solution is not limited to the specific example of FIG. 14.

The examples of FIGS. 9-14 only use TDM to multiplex different users. Thus, each of these examples allocates the entire available frequency domain ASUs, and thus the entire system bandwidth, to each data packet. FIG. 15 shows an exemplary embodiment that uses TDM and FDM when allocating ASUs to different users, where the data for different users is shown using different lined patterns. This allocation frees up additional time and frequency domain resources for additional data packets in Zone 2, e.g., for User 3 and User 4. As shown in FIG. 15, the defined physical layer characteristics (e.g., reference signal density, reference signal distribution, and/or data parameters) for each data packet may be different. In this case, the channel can be frequency selective, e.g., User 1 and/or User 2 may have a good channel at some frequencies (e.g., the lower system bandwidth frequencies) but a worse channel at the other frequencies (e.g., the higher system bandwidth frequencies). The opposite may be true for User 3 and/or User 4. A pure TDM solution would spread out the data across the entire system bandwidth. Using only the "good" frequencies for each user, as shown in FIG. 15, reduces the amount of required resources.

While each of the examples of FIGS. 9-15 show the same reference signal position in the frequency domain for each ASU that includes reference signals, it will be appreciated that this is done only for simple illustration. The reference signal distribution may vary in time and/or frequency for each ASU containing reference signals.

The solution presented herein reduces, in some cases, the number of resources needed for reference signals as a function of the flexible TTI length. Thus, more resources are available for data transmission. For example, FIG. 10 shows a solution that allows more data to be included in the second sub-frame than would have been possible with a conventional reference signal density and distribution, e.g., that of FIG. 5. As another example, FIG. 11 shows a solution that frees up more time and frequency resources in the second sub-frame than would have been available with a conventional reference signal density/distribution, while FIG. 12 shows a solution that frees up even more time/frequency resources, e.g., in the first and third sub-frames. As a result, other physical layer characteristics particular to the data in the data packet, i.e., data rate parameters, may also be defined based on the number of allocated sub-frames. Such data rate parameters include, but are not limited to, the code rate and/or rate matching of the data. For example, the coded bits in a sequence of coded bits (e.g., [x1 x2 x3 x4 x5 . . . ] included with the transmission may vary dependent on the number of allocated sub-frames, e.g., only the following sequence may be transmitted: [x1 x2 x4 x5 x6 x8 . . . ].

As discussed above, the solution presented herein may be implemented by a wireless communication device 100 comprising one or more processing circuits 110 and at least one memory 120. Alternatively, the solution may be implemented by a computer program product, e.g., stored in a non-transitory computer readable medium. In this case, the computer program product comprises software instructions that control the wireless communication device 100 such that when the software instructions are run on the wireless communication device 100, the wireless communication device 100 defines one or more physical layer characteristics of the allocated sub-frames based on the number of allocated sub-frames, and transmits the data packet according to the defined physical layer characteristics in the one or more allocated sub-frames. A carrier containing such a computer program product may comprise an electronic signal, an optical signal, a radio signal, or a computer readable storage medium.

Various elements disclosed herein are described as some kind of circuit, e.g., a processing circuit, an allocation circuit, a channel condition circuit, a resource defining circuit, etc. Each of these circuits may be embodied in hardware and/or in software (including firmware, resident software, microcode, etc.) executed on a controller or processor, including an application specific integrated circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting data from a wireless communication device to a remote device using one or more allocated sub-frames of a transmission time interval (TTI), the method comprising:
    allocating one or more sub-frames to a data packet;
    defining a physical layer characteristic of the allocated one or more sub-frames based on the number of allocated sub-frames, wherein the physical layer characteristic comprises:
        a reference signal density identifying a number of reference signals allocated to the data packet in response to the number of allocated sub-frames, wherein the number of reference signals allocated to the data packet increases disproportionately as the number of allocated sub-frames increases; and
    transmitting, from the wireless communication device, the data packet according to the defined physical layer characteristic in the one or more allocated sub-frames.

2. The method of claim 1,
    wherein defining the physical layer characteristic comprises:
    defining a first configuration of the physical layer characteristic for data packets allocated at least a minimum number of sub-frames; and
    defining a second configuration of the physical layer characteristic for data packets allocated more than the minimum number of sub-frames.

3. The method of claim 1, wherein defining the physical layer characteristic comprises varying the distribution of the one or more reference signals in one or more of the allocated sub-frames based on the number of allocated sub-frames as the number of allocated sub-frames varies.

4. The method of claim 1, further comprising:
determining at least one channel condition associated with the data packet; and
adjusting the defined physical layer characteristic based on the at least one determined channel condition.

5. The method of claim 4, wherein determining the at least one channel condition comprises determining at least one of a speed of the wireless communication device and a speed of a remote receiver in the remote device intended to receive the data packet.

6. The method of claim 4, wherein determining the at least one channel condition comprises determining at least one of:
a carrier frequency;
a frequency selectivity of a wireless channel between the wireless communication device and the remote device; and
a Doppler shift of the wireless channel.

7. The method of claim 1, further comprising adjusting the defined physical layer characteristic based on an available transmission power of the wireless communication device.

8. The method of claim 1, further comprising adjusting the defined physical layer characteristic based on a capability of a remote receiver in the remote device intended to receive the data packet.

9. The method of claim 1, further comprising adjusting the defined physical layer characteristic based on a local system load.

10. A wireless communication device configured to transmit data using one or more allocated sub-frames of a transmission time interval (TTI), the wireless communication device comprising:
an allocation circuit configured to allocate one or more sub-frames to a data packet;
a resource defining circuit configured to define a physical layer characteristic of the allocated one or more sub-frames based on the number of allocated sub-frames, wherein the physical layer characteristic comprises:
a reference signal density identifying a number of reference signals allocated to the data packet in response to the number of allocated sub-frames, wherein the number of reference signals allocated to the data packet increases disproportionately as the number of allocated sub-frames increases; and
a transmitter configured to transmit the data packet according to the defined physical layer characteristic in the one or more allocated sub-frames.

11. A wireless communication device configured to transmit data to a remote device using one or more allocated sub-frames of a transmission time interval (TTI), the wireless communication device comprising:
memory;
one or more processing circuits operatively connected to the memory and configured to allocate one or more sub-frames to a data packet by:
defining a physical layer characteristic of the allocated one or more sub-frames based on the number of allocated sub-frames, wherein the physical layer characteristic comprises:
a reference signal density identifying a number of reference signals allocated to the data packet in response to the number of allocated sub-frames, wherein the number of reference signals allocated to the data packet increases disproportionately as the number of allocated sub-frames increases; and
a transmitter configured to transmit the data packet according to the defined physical layer characteristic in the one or more allocated sub-frames.

12. The wireless communication device of claim 11, wherein the one or more processing circuits are configured to define the physical layer characteristic by:
defining the physical layer characteristic for data packets allocated at least a minimum number of sub-frames; and
defining a second additional physical layer characteristic for data packets allocated more than the minimum number of sub-frames.

13. The wireless communication device of claim 11, wherein the one or more processing circuits are configured to define the physical layer characteristic by varying the distribution of the one or more reference signals in one or more of the allocated sub-frames based on the number of allocated sub-frames as the number of allocated sub-frames varies.

14. The wireless communication device of claim 11, wherein the one or more processing circuits are configured to:
determine at least one channel condition associated with the data packet; and
adjust the defined physical layer characteristic based on the at least one determined channel condition.

15. The wireless communication device of claim 14, wherein the one or more processing circuits are configured to determine the at least one channel condition by determining at least one of a speed of the wireless communication device and a speed of a remote receiver in the remote device intended to receive the data packet.

16. The wireless communication device of claim 14, wherein the one or more processing circuits are configured to determine the at least one channel condition by determining at least one of:
a carrier frequency;
a frequency selectivity of a wireless channel between the wireless communication device and the remote device; and
a Doppler shift of the wireless channel.

17. The wireless communication device of claim 11, wherein the one or more processing circuits are configured to adjust the defined physical layer characteristic based on an available transmission power of the wireless communication device.

18. The wireless communication device of claim 11, wherein the one or more processing circuits are configured to adjust the defined physical layer characteristic based on a capability of a remote receiver in the remote device intended to receive the data packet.

19. The wireless communication device of claim 11, wherein the one or more processing circuits are configured to adjust the defined physical layer characteristic based on a local system load.

20. A computer program product stored in a non-transitory computer readable medium for controlling transmission of data from a wireless communication device to a remote device using one or more allocated sub-frames of a transmission time interval (TTI), the computer program product comprising software instructions which, when run on one or more processing circuits of the wireless communication device, causes the wireless communication device to:
allocate one or more sub-frames to a data packet;

define a physical layer characteristic of the allocated one or more sub-frames based on the number of allocated sub-frames, wherein the physical layer characteristic comprises a reference signal density identifying a number of reference signals allocated to the data packet in response to the number of allocated sub-frames, wherein the number of reference signals allocated to the data packet increases disproportionately as the number of allocated sub-frames increases; and transmit, from the wireless communication device, the data packet according to the defined physical layer characteristic in the one or more allocated sub-frames.

* * * * *